United States Patent
Eriksson et al.

(10) Patent No.: US 9,426,260 B2
(45) Date of Patent: Aug. 23, 2016

(54) REAL TIME COMMUNICATION OVER TCP

(71) Applicant: Telefonaktiebolaget L M Ericsson (publ), Stockholm (SE)

(72) Inventors: Hans Eriksson, Sollentuna (SE); Lars Westberg, Enkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 89 days.

(21) Appl. No.: 14/457,281

(22) Filed: Aug. 12, 2014

(65) Prior Publication Data

US 2015/0058446 A1 Feb. 26, 2015

(30) Foreign Application Priority Data

Aug. 20, 2013 (EP) .................................... 13181070

(51) Int. Cl.

| | |
|---|---|
| *G06F 15/16* | (2006.01) |
| *H04L 29/06* | (2006.01) |
| *H04L 29/08* | (2006.01) |
| *H04L 1/18* | (2006.01) |

(52) U.S. Cl.
CPC ........... *H04L 69/163* (2013.01); *H04L 65/608* (2013.01); *H04L 67/02* (2013.01); *H04L 1/1877* (2013.01); *H04L 65/4069* (2013.01)

(58) Field of Classification Search
CPC ....... H04L 29/06; H04L 1/18; H04L 65/608; H04L 67/02
USPC ....................................................... 709/217
See application file for complete search history.

(56) References Cited

U.S. PATENT DOCUMENTS

| | | | |
|---|---|---|---|
| 2007/0008884 A1* | 1/2007 | Tang ....................... | H04L 29/06 370/230 |
| 2008/0123660 A1* | 5/2008 | Sammour ............... | H04L 47/10 370/395.21 |

OTHER PUBLICATIONS

The evaluation of communication characteristics of cellular network and development of retransmission-controlled TCP. Shuta Yokoyama, Hiroshi Ymamoto, Katsuyuki Yamazaki. Nagaoka University of Technology, Japan pp. 30-35, 2012.*
Techniques and protocols for distributed Media streaming Ma Lin (Ph.D) National University of Singapore (2007) pp. 1-152.*

* cited by examiner

*Primary Examiner* — Tauqir Hussain
(74) *Attorney, Agent, or Firm* — NDWE LLP

(57) ABSTRACT

A method performed in a first communication device for real-time communication over a Transmission Control Protocol (TCP) with a second communication device comprises obtaining a first TCP segment having a first sequence number from a TCP buffer in the first communication device, forming a first IP packet comprising the first TCP segment, and transmitting the first IP packet towards the second communication device. The method comprises receiving an indication that the first TCP segment should be retransmitted, and forming a second IP packet comprising the first sequence number of the first TCP segment, and payload data for a second TCP segment which is next in line after the first TCP segment in the TCP buffer. The method comprises transmitting the second IP packet comprising the payload data for the second TCP segment in place of a retransmission of the first TCP segment towards the second communication device.

13 Claims, 4 Drawing Sheets

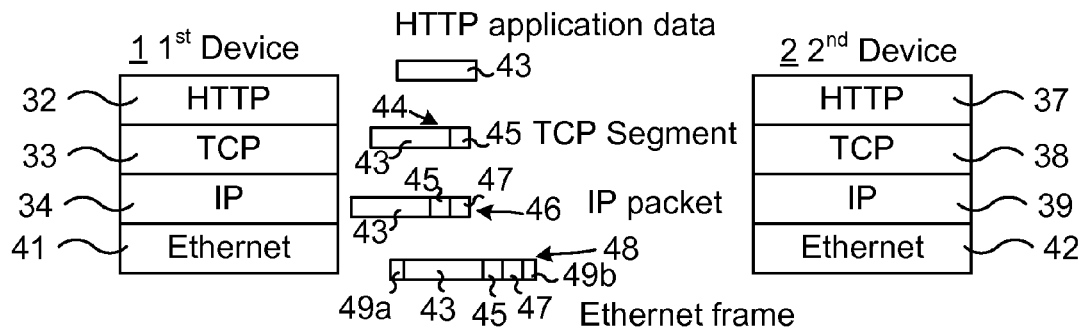
Fig. 4
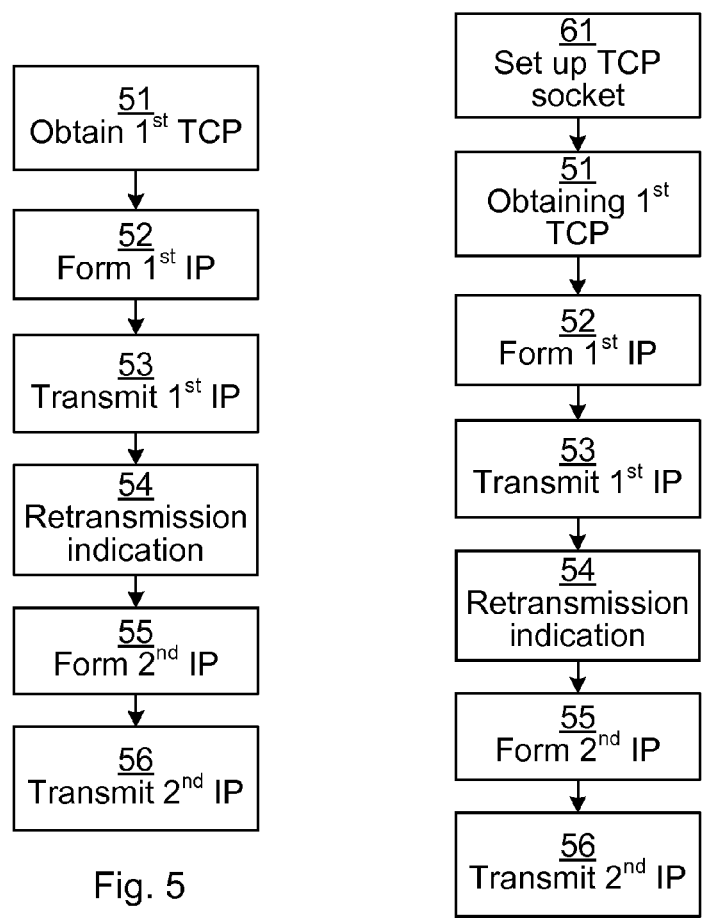
Fig. 5
Fig. 6

REAL TIME COMMUNICATION OVER TCP

CROSS-REFERENCE TO RELATED APPLICATIONS

This application claims the benefit of EP Application No. 13181070.7, filed Aug. 20, 2013, which is hereby incorporated by reference.

TECHNICAL FIELD

The present disclosure relates to a method and a device for real time communication between two communication devices over an internet protocol.

BACKGROUND

Web based real time communication services (WebRTC) have become more popular in recent years. A majority of WebRTC clients are web browsers and used behind a Network Address Translation (NAT) and/or firewall. WebRTC clients uses a Real-time Transport Protocol (RTP)/ User Datagram Protocol (UDP) based data transmission scheme for multimedia sessions. UDP has well known NAT traversal problems and without native capabilities to traverse a NAT, WebRTC clients will be limited in their functionality. Fortunately, NAT traversal for UDP is a solved problem, but solutions require that clients transmitting media between each other use the same NAT traversal algorithms. Without a consistent, well specified NAT traversal mechanism, WebRTC client implementations would likely be inoperable with each other.

For Hypertext Transfer Protocol (HTTP)/Transmission Control Protocol (TCP), the NAT traversal over port 80 is standard and solves the problem of NAT traversal. But TCP is not designed for real-time communications due to the TCP behaviour and its transaction control mechanisms using retransmission and acknowledgement procedures. Thus, the TCP architecture gives long delays and poor Quality of experience (QoE) for real-time applications.

The classical Internet Protocol (IP) protocol stack architecture in a communication terminal is shown in FIG. 1, with the application codec (not shown) located above the HTTP/application layer. Other examples of protocols in the application layer includes Domain Name System (DNS), File Transfer Protocol (FTP) and RTP. Below the application layer resides the transport layer with the TCP and UDP protocols. The task of TCP is to transmit IP packets in a reliable way from point A to B. But in the case of low delay and real time there is no time for retransmission, i.e., even if the IP packet is re-sent, it will be received too late and discarded by the receiving side (e.g., transcoder). UDP is typically used where retransmission is not used and the application is designed to handle some level of packet loss without major impact on the perceived quality of the service. Below the transport protocol is the IP layer, and lower still is the link layer with the Ethernet protocol, etc.

As shown in FIG. 2, a TCP session between a source/client device and a destination/server device comprises signalling in three phases, a connection setup phase, a data transfer phase where the actual data is transferred between the devices with acknowledgements sent in-between, and a connection teardown phase.

SUMMARY

Exemplary methods for providing real-time communication with reduced problem with NAT and firewall traversal are described herein. More specifically, HTTP/TCP is used instead of RTP/UDP for real-time communication services but with shorter round-trip delay time (RTT). However, this implies that a new application architecture is used to enable use of TCP for real-time communication.

According to an aspect of the present invention, a method performed in a first communication device for real-time communication over the TCP with a second communication device comprises obtaining a first TCP segment having a first sequence number from a TCP buffer in the first communication device. The method also comprises forming a first IP packet comprising the first TCP segment. The method also comprises transmitting the first IP packet comprising the first TCP segment with the first sequence number, towards the second communication device. The method also comprises receiving an indication that the first TCP segment should be retransmitted. The method also comprises forming a second IP packet, wherein the second IP packet comprises the first sequence number of the first TCP segment, and payload data for a second TCP segment which is next in line after the first TCP segment in the TCP buffer. The method also comprises transmitting the second IP packet comprising the payload data for the second TCP segment in place of a retransmission of the first TCP segment towards the second communication device in response to the received indication.

According to one embodiment, an indication (e.g., negative acknowledgement) for retransmission of a TCP segment in accordance with the TCP protocol prompts the first communication device to form an IP packet comprising the sequence number of the TCP segment for which a retransmission indication was received and the payload of the subsequent TCP segment to be transmitted. The TCP session thus proceeds in a standard fashion since the retransmitted TCP segment in the second IP packet has the same sequence number as the previously sent TCP segment, but new payload data is sent (old payload data is not retransmitted) facilitating real-time communication.

According to one embodiment, there is provided a computer program product comprising computer-executable components for causing a communication device to perform embodiments of the present invention when the computer-executable components are run on a processor circuitry comprised in the communication device.

According to one embodiment, there is provided a first communication device configured for real-time communication over TCP with a second communication device. The first communication device comprises processor circuitry (e.g., one or more processors), and a storage unit (e.g., a non-transitory machine-readable storage medium) storing instructions (i.e., code) that, when executed by the processor circuitry, cause the first communication device to obtain a first TCP segment, having a first sequence number, from a TCP buffer in a TCP layer in the first communication device. The instructions also cause the first communication device to form a first IP packet comprising the first TCP segment. The instructions also cause the first communication device to transmit the first IP packet, comprising the first TCP segment with the first sequence number, towards the second communication device. The instructions also cause the first communication device to receive an indication that the first TCP segment should be retransmitted. The instructions also cause the first communication device to form a second IP packet, wherein the second IP packet comprises the first sequence number of the first TCP segment, and payload data for a second TCP segment which is next in line after the first TCP segment in the TCP buffer. The instructions also cause the first communication device to transmit the second IP packet comprising the payload data for the second TCP segment in place of a retransmission of the first TCP segment towards the second communication device in response to the received indication.

According to another aspect of the present invention, there is provided a first computer program for real-time communication over TCP between a first communication device and a second communication device. The computer program comprises computer program code which is able to, when run on processor circuitry of the first communication device, cause the first communication device to obtain a first TCP segment, having a first sequence number, from a TCP buffer in a TCP layer in the first communication device. The code is also able to cause the first communication device to form a first IP packet comprising the first TCP segment. The code is also able to cause the first communication device to transmit the first IP packet, comprising the first TCP segment with the first sequence number, towards the second communication device. The code is also able to cause the first communication device to receive an indication that the first TCP segment should be retransmitted. The code is also able to cause the first communication device to form a second IP packet, wherein the second IP packet comprises the first sequence number of the first TCP segment, and payload data for a second TCP segment which is next in line after the first TCP segment in the TCP buffer. The code is also able to cause the first communication device to transmit the second IP packet comprising the payload data for the second TCP segment in place of a retransmission of the first TCP segment towards the second communication device in response to the received indication.

According to another aspect of the present invention, there is provided a computer program product comprising an embodiment of the computer program of the present disclosure and a computer readable means on which the computer program is stored.

It is advantageous that, in accordance with the present disclosure, an indication (e.g., negative acknowledgement) for retransmission of a TCP segment in accordance with the TCP protocol prompts the first communication device to form an IP packet comprising the sequence number of the TCP segment for which a retransmission indication was received and the payload of the subsequent TCP segment to be transmitted. The TCP session thus proceeds without changes to the TCP protocol since the retransmitted TCP segment in the second IP packet has the same sequence number as the previously sent TCP segment, but new payload data is sent (old payload data is not retransmitted) facilitating real-time communication. This facilitates real-time communication between the first and second communication devices over TCP, e.g. for voice, video, live broadcasting, gaming or the like.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 4 is a schematic block diagram illustrating a TCP communication session between first and second communication devices in accordance with an embodiment of the present disclosure.

FIG. 5 is a schematic flow chart of an embodiment of the method of the present disclosure.

FIG. 6 is a schematic flow chart of another embodiment of the method of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
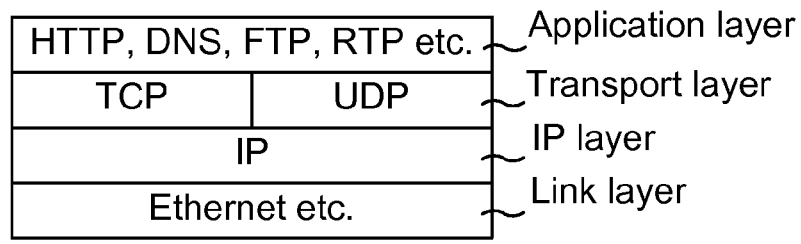
FIG. 1 is a schematic block diagram of an IP protocol stack.
Figure 2:
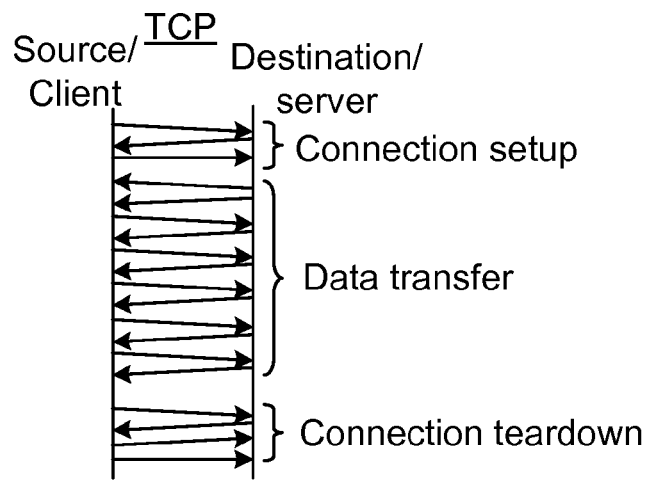
FIG. 2 is a schematic signalling diagram of a TCP session.
Figure 3:
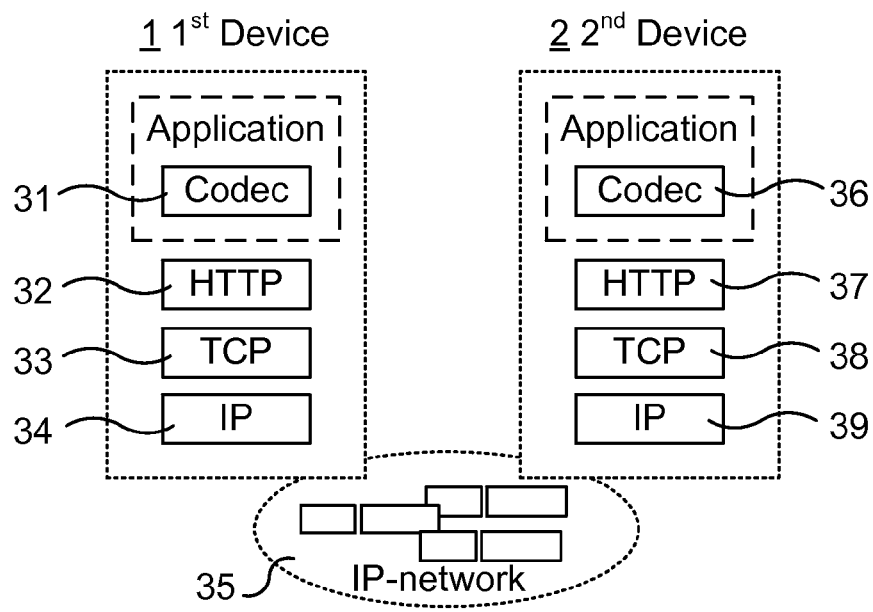
FIG. 3 is a schematic block diagram of an IP communication system in accordance is an embodiment of the present disclosure.

FIG. 3 schematically illustrates an embodiment of an IP communication system in accordance with the present disclosure. The communication system comprises a first communication device 1 communicatively coupled to a second communication device 2 via an IP network 35. Each of the first and second communication devices 1 and 2 comprises an IP protocol stack as well as an application for performing a real-time communication via the protocol stacks. Referring now to the first communication device 1, the application uses a codec 31 for digital coding/decoding of the data transmitted between the communication devices 1 and 2. Below the application, there is an application layer 32 of the protocol stack using HTTP, a transport layer 33 using TCP and an internet layer 34 using IP. Similarly, the second communication device 2 has an application that uses a codec 36 for digital coding/decoding of the data transmitted between the communication devices 1 and 2. Below the application, there is an application layer 37 of the protocol stack using HTTP, a transport layer 38 using TCP and an internet layer 39 using IP.

FIG. 4 illustrates data transmission within a TCP session between the first and second communication devices 1 and 2 in accordance with an embodiment of the present invention. The protocol stacks of the first and second communication devices 1 and 2 are schematically shown, wherein the first communication device 1 has an application layer 32 using HTTP, a transport layer 33 using TCP, an internet layer 34 using IP and a link layer 41 using Ethernet. Similarly, the second communication device 2 has an application layer 37 using HTTP, a transport layer 38 using TCP, an internet layer 39 using IP and a link layer 42 using Ethernet. When the first and second devices 1 and 2 communicate with each other, HTTP application data 43 is produced in the application layers 32 and 37, respectively, and then sent as payload data down the protocol stack of the sending device (here device 1) and later up the protocol stack of the receiving device (here device 2). In the transport layer 33, a TCP segment 44 is formed, including the payload data 43 from the application layer 32 and a sequence number 45 in a TCP header attached to the payload 43. In the internet layer 34, the TCP segment 44 is attached to an IP header 47 to form an IP packet 46. In the link layer 41, an Ethernet frame 48 is formed by adding a prefix 49a and a suffix 49b to the IP packet. The Ethernet frame 48 can then be transmitted via an IP network 35 to the second device 2 where a reverse process takes place to eventually obtain the HTTP application data 43 in the application layer 37.

FIG. 5 is a schematic flow chart of an embodiment of the method of the present invention. A first TCP segment 44, having a first sequence number 45, is obtained at block 51 from a TCP buffer in the first communication device 1. The communication device 1 holds a TCP buffer comprising queued TCP segments to be sent to the second communication device 2, each TCP segment comprising a data payload 43 and a sequence number 45. Typically, the TCP segment first in line in the buffer queue is taken from the buffer and thus obtained at block 51 for further processing and transmission to the second device 2. A first Internet Protocol (IP) packet 46 is formed at block 52, the first IP packet comprising the first TCP segment. The first IP packet 46, comprising the first TCP segment 44 with the first sequence number 45 is transmitted at block 53 from the first device 1, towards the second communication device 2. For example, the first IP packet is transmitted at block 53 in an Ethernet frame 48 as discussed herein. Then, an indication that the first TCP segment 44 should be retransmitted is received at block 54. For example, the indication is received at block 54 by receiving a negative acknowledgement (NAK) or other retransmission request from the second device 2, indicating that the first TCP segment was not properly received by the second device 2. A second IP packet is formed at block 55. The second IP packet is formed at block 55 to comprise the first sequence number 45 of the first TCP segment 44, and payload data 43 for a second TCP segment which is next in line after the first TCP segment in the TCP buffer. Thus, a second IP packet having the same TCP sequence number 45 as the first TCP segment sent with the first IP packet is formed at block 55, satisfying the criterion of the expected retransmission of the first TCP segment. The second IP packet comprising the payload data 43 for the second TCP segment is then transmitted at block 56 in place of a retransmission of the first TCP segment 44 towards the second communication device in response to the received indication at block 54. The TCP session thus proceeds in accordance with the TCP protocol with retransmission of the first TCP segment, but with the TCP segment of the retransmission containing the payload of a second TCP segment instead of the payload of the first TCP segment as in normal TCP communication. HTTP data 43 can in this way be sent without delay, in real-time, regardless of the retransmission feature of TCP. The improperly received payload data of the first TCP segment 44 is disregarded in the hope that the real-time data transmission can proceed without it. The result may be a glitch, for example, in the voice or video stream at the receiver end (at the second device 2).

FIG. 6 is a schematic flow chart of another embodiment of the method of the present invention. The embodiment is in accordance with the embodiment discussed with reference to FIG. 5, but the operation of obtaining the first TCP segment 44 (e.g., at block 51) is preceded by the setting up at block 61 of a TCP socket at the first communication device 1 for the TCP session between the first and second communication devices 1 and 2. Thus, in some embodiments of the present invention, the method further comprises setting up a TCP socket for the real-time communication between the first communication device 1 and the second communication device 2, in response to a control parameter indicating that said forming a second IP packet at block 55 should be used for the real-time communication.

Figure 7:
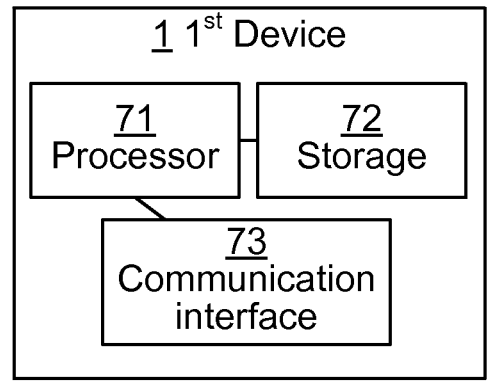
FIG. 7 is a schematic block diagram of an embodiment of the first communication device of the present disclosure.

FIG. 7 is a schematic block diagram illustrating an embodiment of the first communication device 1. The first communication device 1 comprises processor circuitry 71, for example, a central processing unit (CPU). The processor circuitry 71 may comprise one or a plurality of processing units in the form of microprocessor(s). However, other suitable devices with computing capabilities could be comprised in the processor circuitry 71, e.g., an application specific integrated circuit (ASIC), a field programmable gate array (FPGA) or a complex programmable logic device (CPLD). The processor circuitry 71 is configured to run one or several computer program(s) or software stored in a storage unit 72, for example, a memory. The storage unit is regarded as a computer readable medium and may, for example, be in the form of a Random Access Memory (RAM), a Flash memory or other solid state memory, or a hard disk, a non-transitory computer-readable storage medium, etc., or be a combination thereof. The processor circuitry 71 is also configured to store data in the storage unit 72, as needed. The communication device also comprises a communication interface 73 configured for wired or wireless communication with the second communication device 2 via the IP network 35, sending messages to the second device 2 as well as receiving messages from the second device 2 in cooperation with the processor circuitry 71.

Figure 8:
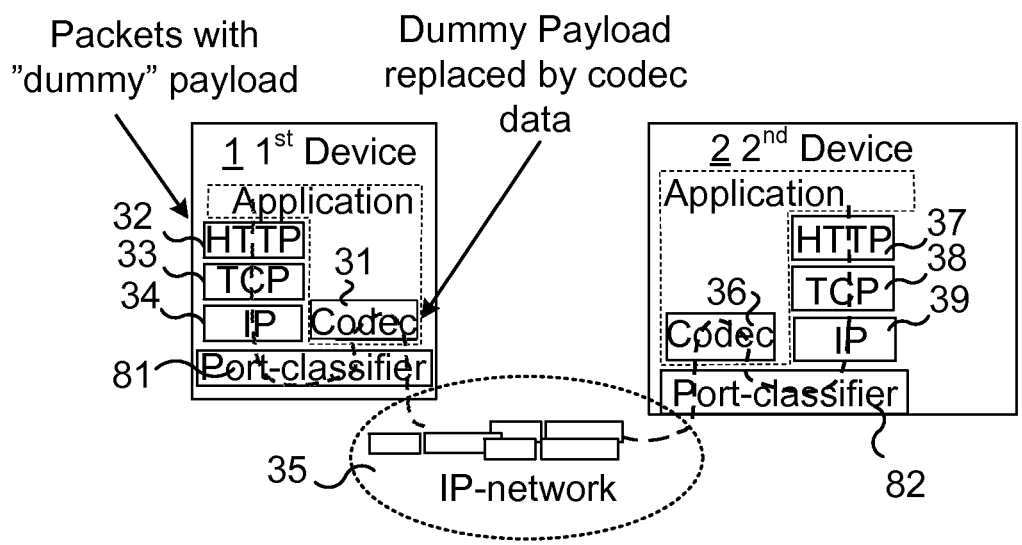
FIG. 8 is a schematic block diagram of an IP communication system in accordance with an example embodiment of the present disclosure.

In some embodiments of the present invention, the first and second TCP segments 44 in the TCP buffer comprise dummy data, and the respective payload data 43 to be transmitted in the first and second IP packets 46 replaces the dummy data when forming (e.g., at blocks 52 and 55) the first and second IP packets, respectively, to be transmitted (e.g., at blocks 53 and 56). In some embodiments, a codec 31 is logically positioned in the IP layer 34 of the first communication device 1, said codec replacing the dummy data of the TCP segments 44 with the payload data 43 to be transmitted when forming the first and second IP packets 46, respectively, to be transmitted. This is illustrated in FIG. 8 where a dashed line indicates the path through the protocol stacks of the first and second communication devices 1 and 2 via the IP network 35. The figure is in analogy with FIG. 3 but the codecs 31 and 36, respectively, of the applications run on the devices 1 and 2 have been moved down in the stacks, level with the internet layers 34 and 39, respectively. Port-classifiers 81 and 82 of the first and second devices 1 and 2, respectively, are also shown. Referring now to the first device 1, the application generates dummy data, e.g., all zeros, to the application layer 32, which is then attached to a TCP sequence number header 45 in the transport layer 33 to form the TCP segments 44. Then, when forming (e.g., as part of blocks 52 and 55) the corresponding IP packets (e.g., as part of blocks 52 and 55), the codec 31 switches the dummy data of the TCP segment for the payload data 43 which is to be sent to the second device 2. In accordance with this embodiment, the TCP session may proceed in accordance with the TCP protocol, including retransmissions of TCP segments, but with dummy data. The actual data to be sent is instead included in the IP packets below the transport layer 33 which uses the TCP. In this way, real-time communication is facilitated and delays due to retransmissions are avoided. Thus, in some embodiments, the first communication device 1 comprises a codec 31 logically positioned in the IP layer 34 of the first communication device 1, said codec being configured to replace dummy data of the TCP segments 44 with payload data 43 to be transmitted when forming (e.g., as part of blocks 52 and 55) the first and second IP packets 46, respectively, to be transmitted (e.g., as part of blocks 53 and 56).

Figure 9:
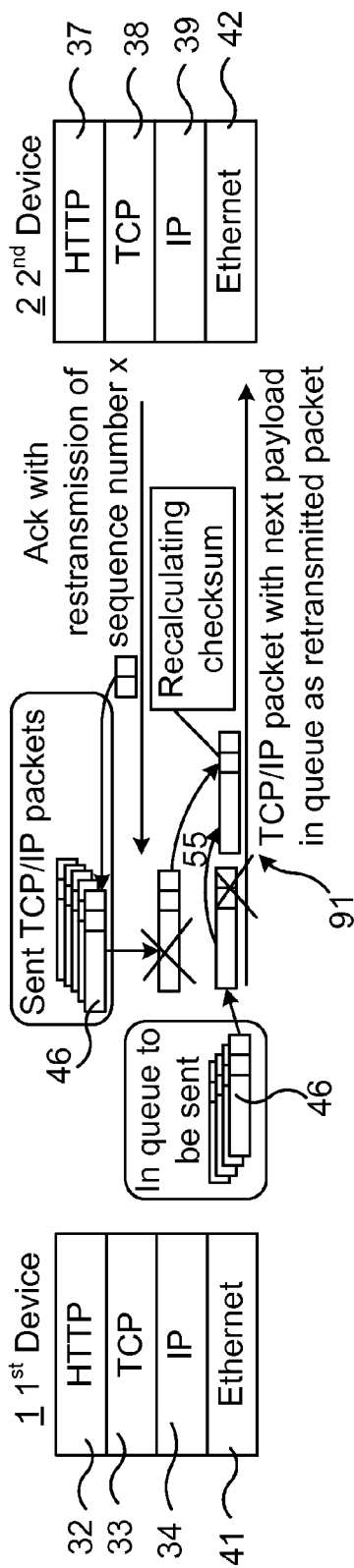
FIG. 9 is a schematic block diagram of an IP communication system in accordance with an example embodiment of the present disclosure.

In some embodiments of the present invention, the first and second TCP segments 44 in the TCP buffer comprise payload data 43 to be transmitted in the first and second IP packets 46, respectively, and the forming (e.g., at block 55) of a second IP packet comprises transforming the second TCP segment into the second IP packet, wherein a second sequence number 45 of the second TCP segment is replaced with the first sequence number of the first TCP segment in the second IP packet. Here, in contrast with the embodiments discussed with reference to FIG. 8, it is not the payload data 43 which is exchanged, but the sequence number 45. A potential disadvantage is that logic is needed in the first device 1 to keep track of which sequence number is expected by the second device 2 in the TCP session. On the other hand, the codec 31 need not be moved from the application layer 32 to the Internet layer 34. Instead of exchanging the sequence number 45 when forming an IP packet from the TCP segment, an IP packet may first be formed in a standard fashion from the second TCP segment, including the second sequence number, after which the second IP packet is formed 55 by exchanging the second sequence number with the first sequence number. Thus, the sequence number 45 can be exchanged after forming an IP packet. This is illustrated in FIG. 9. FIG. 9 shows the first device 1 holding a buffer of queued IP packets 46 to be sent to the second device 2, as well as a buffer of already sent IP packets 46. If a negative acknowledgement, an ACK with a request for retransmission of the first TCP segment 44 by indicating its first sequence number 45, is received (e.g., at block 54) (as indicated by the horizontal arrow towards the first device 1), the first device 1 will form (e.g., as part of block 55) the second IP packet 91 by combining the payload 43 of the IP packet 46 next in line to be sent with the IP and TCP headers (including the sequence number 45) of the previously sent IP packet comprising the TCP segment having the sequence number for which retransmission was requested. This is illustrated in FIG. 9 by crossing out the headers of the IP packet from the buffer of packets to be transmitted and crossing out the payload of the IP packet to be resent from the buffer of already sent IP packets 46, and combining the two IP packets to form (e.g., as part of block 55) the second IP packet 91. In this embodiment, the checksum may also need to be recalculated to be able to recreate the header expected by the TCP session at the second device 2. Thus, in some embodiments, the first and second TCP segments 44 in the TCP buffer comprise payload data 43 to be transmitted in the first and second IP packets 46, respectively, and wherein the forming (e.g., as part of block 55) a second IP packet comprises transforming the second TCP segment into an IP packet which is then transformed into the second IP packet, said transforming into the second IP packet 91 comprising replacing a second sequence number of the second TCP segment with the first sequence number of the first TCP segment in the second IP packet. Consequently, in some embodiments of the first communication device 1, its TCP layer 33 is configured to replace a second sequence number of the second TCP segment with the first sequence number of the first TCP segment in the second IP packet. Further, in other embodiments of the first communication device 1, it also comprises a function below the TCP layer 33 configured to replace a second sequence number of the second TCP segment with the first sequence number of the first TCP segment in the second IP packet.

In some embodiments, the real-time communication is over the Hypertext Transfer Protocol (HTTP) in the application layer 32 of the first communication device 1, as discussed above. However, other application layer protocols are also contemplated.

In some embodiments, port 80 is used for the real-time communication. This may be a convenient port to use to avoid NAT and firewall related problems.

Figure 10:
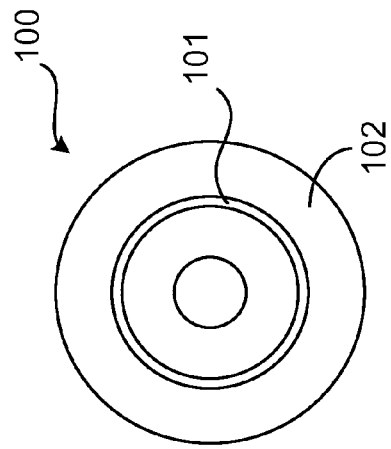
FIG. 10 is a schematic illustration of an embodiment of a computer program product of the present disclosure.

FIG. 10 illustrates a computer program product 100. The computer program product 100 comprises a computer readable medium 102 comprising a computer program 101 in the form of computer-executable components 101. The computer program/computer-executable components 101 may be configured to cause a first communication device 1, e.g., as discussed herein, for real-time communication over TCP with a second communication device 2 to perform an embodiment of the method of the present disclosure. The computer program/computer-executable components may be run on the processor circuitry 71 of the device 1 for causing the device to perform the method. The computer program product 100 may e.g., be comprised in a storage unit or memory 72 comprised in the device 1 and associated with the processor circuitry 71. Alternatively, the computer program product 100 may be, or be part of, a separate, e.g. mobile, storage means, such as a computer readable disc, e.g. CD or DVD or hard disc/drive, or a solid state storage medium, e.g. a RAM or Flash memory.

Example 1 cf. FIG. 8

The following sequences is proposed.
At TCP session setup:
1. A TCP-session is established (e.g., as part of block 61) with a specific port.
2. The HTTP-session exchange is done between the applications. One or multiple HTTP-session(s) may be established by the application.

The port-number for the HTTP/TCP media session is configured in the port-classifier 81 such that the HTTP/TCP media session will pass the codec 31.

During the session:
1. The application is creating packets with dummy payloads at the application/HTTP layer 32.
2. The specific application traffic is identified by the port-classifier 81 and sent to the codec 31.
3. The codec 31 replaces the dummy payload with payload data 43.
4. A new TCP-checksum/IP-header-checksum is re-calculated based for the new payload.

5. The packet is transmitted (e.g., as part of block 56) to the outgoing communication interface 73.

Example 2 cf. FIG. 9

1. When a new TCP socket is opened (e.g., as part of block 61) it may be marked as low delay by introducing a new control parameter in order to indicate that real-time communication is desired and that an embodiment of the present invention should be used. TCP establishment and teardown signalling works as defined in standard without any changes.

2. During the data transfer of the TCP session when packet loss is indicated (e.g., as part of block 54), i.e., sequence number points to an earlier packet, the first device 1 will disregard that information and only pick next IP packet to be transmitted but use the sequence number 45 from the acknowledgement (ACK) message from the second device 2 so that it looks like a retransmission that is sent back to the second device 2.

3. An alternative to #2 above is to insert a new middleware function below the TCP layer 33 (e.g., between the TCP layer 33 and the IP layer 34) which replaces the payload in the IP packet 46 with the next TCP segment 44 in the TCP buffer. In this solution the TCP segment (header) may be recreated by copying the original TCP segment in the IP packet and replacing the sequence number with the first sequence number 45 indicated 54 for retransmission and to recalculate the checksum filed.

Example 3

In this example, the second device 2 (receiving side) omits to send indications for retransmissions.

1. When a new TCP socket is opened (e.g., as part of block 61) it may be marked as low delay by introducing a new control parameter. In the TCP establishment signalling, the parameter low delay is transmitted to the second device 2. This information can be carried, e.g., in any of the reserved bits in the TCP header.

2. During data transfer phase, an additional function is needed in the second device 2. If low delay request has been received by the second device 2, the TCP layer 38 will skip sending the retransmission request. I.e., if a TCP packet is lost, and a higher sequence number is received than expected, the ACK will indicate the highest sequence number 45 to the first device 1, calculated based on current received TCP segment.

Below follows another aspect of the present invention.

According to an aspect of the present invention, there is provided a first communication device (e.g., communication device 1) configured for real-time communication over the Transmission Control Protocol (TCP) with a second communication device (e.g., second communication device 2). The first communication device comprises means (e.g., processor 71) for obtaining (e.g., as part of block 51) a first TCP segment (e.g., first TCP segment 44), having a first sequence number (e.g., first sequence number 45), from a TCP buffer in the first communication device. The first communication device also comprises means (e.g., processor 71) for forming (e.g., as part of block 52) a first Internet Protocol (IP) packet (e.g., IP packet 46) comprising the first TCP segment. The first communication device also comprises means (e.g., processor 71 and communication interface 73) for transmitting (e.g., as part of block 53) the first IP packet, comprising the first TCP segment with the first sequence number, towards the second communication device (e.g., second communication device 2). The first communication device also comprises means (e.g., processor 71 and communication interface 73) for receiving (e.g., as part of block 54) an indication that the first TCP segment (e.g., first TCP segment 44) should be retransmitted. The first communication device also comprises means (e.g., processor 71) for forming (e.g., as part of block 55) a second IP packet (e.g., second IP packet 91), wherein the second IP packet comprises the first sequence number (e.g., first sequence number 45) of the first TCP segment (e.g., first TCP segment 44), and the second IP packet (e.g., second IP packet 91) also comprises payload data (e.g., payload data 43) for a second TCP segment which is next in line after the first TCP segment in the TCP buffer. The first communication device also comprises means (e.g., processor 71 and communication interface 73) for transmitting (e.g., as part of block 56) the second IP packet (e.g., second IP packet 91) comprising the payload data (e.g., payload data 43) for the second TCP segment in place of a retransmission of the first TCP segment (e.g., first TCP segment 44) towards the second communication device in response to the received indication (e.g., as part of block 54).

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method performed in a first communication device for real-time communication over a Transmission Control Protocol (TCP) with a second communication device, the method comprising:
    obtaining a first TCP segment having a first sequence number from a TCP buffer in the first communication device;
    forming a first Internet Protocol (IP) packet comprising the first TCP segment and the first sequence number;
    transmitting the first IP packet comprising the first TCP segment with the first sequence number via a network to the second communication device;
    obtaining a second TCP segment having a second sequence number from the TCP buffer in the first communication device;
    forming a second IP packet comprising the second TCP segment and the second sequence number;
    receiving an indication that the first TCP segment should be retransmitted;
    replacing the second sequence number in the second IP packet with the first sequence number of the first IP packet; and
    transmitting the second IP packet comprising the second TCP segment with the first sequence number, instead of retransmitting the first IP packet, to the second communication device to meet TCP requirement of retransmission of a TCP segment associated with the first sequence number, but instead transmitting the second TCP segment to maintain real-time data flow to the second communication device.

2. The method of claim 1, wherein the first and second TCP segments in the TCP buffer comprise payload data to be transmitted in the first and second IP packets, respectively.

3. The method of claim 1, further comprising setting up a TCP socket for the real-time communication between the first communication device and the second communication device, in response to a control parameter indicating that said forming the second IP packet should be used for the real-time communication.

4. The method of claim 1, wherein the real-time communication is over a Hypertext Transfer Protocol (HTTP) in an application layer of the first communication device.

5. The method of claim 1, wherein port 80 is used for the real-time communication.

6. A non-transitory computer-readable storage medium having computer code stored therein, which when executed by a processor of a first communication device for real-time communication over a Transmission Control Protocol (TCP) with a second communication device, cause the first communication device to perform operations comprising:
- obtaining a first TCP segment having a first sequence number from a TCP buffer in the first communication device;
- forming a first Internet Protocol (IP) packet comprising the first TCP segment and the first sequence number;
- transmitting the first IP packet comprising the first TCP segment with the first sequence number via a network to the second communication device;
- obtaining a second TCP segment having a second sequence number from the TCP buffer in the first communication device;
- forming a second IP packet comprising the second TCP segment and the second sequence number;
- receiving an indication that the first TCP segment should be retransmitted;
- replacing the second sequence number in the second IP packet with the first sequence number of the first IP packet; and
- transmitting the second IP packet comprising the second TCP segment with the first sequence number, instead of retransmitting the first IP packet, to the second communication device to meet TCP requirement of retransmission of a TCP segment associated with the first sequence number, but instead transmitting the second TCP segment to maintain real-time data flow to the second communication device.

7. The non-transitory computer-readable storage medium of claim 6, wherein the first and second TCP segments in the TCP buffer comprise payload data to be transmitted in the first and second IP packets, respectively.

8. The non-transitory computer-readable storage medium of claim 6, further comprising setting up a TCP socket for the real-time communication between the first communication device and the second communication device, in response to a control parameter indicating that said forming the second IP packet should be used for the real-time communication.

9. The non-transitory computer-readable storage medium of claim 6, wherein the real-time communication is over a Hypertext Transfer Protocol (HTTP) in an application layer of the first communication device.

10. The non-transitory computer-readable storage medium of claim 6, wherein port 80 is used for the real-time communication.

11. A first communication device configured for real-time communication over a Transmission Control Protocol (TCP) with a second communication device, the first communication device comprising:
- a set of one or more processors; and
- a non-transitory machine-readable storage medium containing code, which when executed by the set of one or more processors, cause the first communication device to:
  - obtain a first TCP segment having a first sequence number from a TCP buffer in a TCP layer in the first communication device;
  - form a first Internet Protocol (IP) packet comprising the first TCP segment and the first sequence number;
  - transmit the first IP packet comprising the first TCP segment with the first sequence number via a network to the second communication device;
  - obtain a second TCP segment having a second sequence number from the TCP buffer in the first communication device;
  - form a second IP packet comprising the second TCP segment and the second sequence number;
  - receive an indication that the first TCP segment should be retransmitted;
  - replace the second sequence number in the second IP packet with the first sequence number of the first IP packet; and
  - transmit the second IP packet comprising the second TCP segment with the first sequence number, instead of retransmitting the first IP packet, to the second communication device to meet TCP requirement of retransmission of a TCP segment associated with the first sequence number, but instead transmitting the second TCP segment to maintain real-time data flow to the second communication device.

12. The first communication device of claim 11, wherein the TCP layer is operable to replace the second sequence number of the second TCP segment with the first sequence number of the first TCP segment in the second IP packet.

13. The first communication device of claim 11, further comprising a function below the TCP layer configured to replace the second sequence number of the second TCP segment with the first sequence number of the first TCP segment in the second IP packet.

* * * * *